United States Patent
Ramirez et al.

(10) Patent No.: US 10,961,407 B2
(45) Date of Patent: Mar. 30, 2021

(54) SOLVENT-UV HYBRID INKJET INK FOR ALUMINUM BEVERAGE CAN DECORATION

(71) Applicant: INX International Ink Co., Schaumburg, IL (US)

(72) Inventors: Robert Ramirez, Castro Valley, CA (US); Carlos Javier Hernandez, San Leandro, CA (US)

(73) Assignee: INX INTERNATIONAL INK CO., Schaumburg, IL (US)

( * ) Notice: Subject to any disclaimer, the term of this patent is extended or adjusted under 35 U.S.C. 154(b) by 0 days.

(21) Appl. No.: 16/402,036

(22) Filed: May 2, 2019

(65) Prior Publication Data

US 2020/0095436 A1    Mar. 26, 2020

Related U.S. Application Data

(63) Continuation of application No. 15/229,557, filed on Aug. 5, 2016, now abandoned.

(60) Provisional application No. 62/322,007, filed on Apr. 13, 2016.

(51) Int. Cl.
| | |
|---|---|
| *C09D 11/101* | (2014.01) |
| *C09D 11/36* | (2014.01) |
| *B41M 5/00* | (2006.01) |
| *B41M 7/00* | (2006.01) |

(52) U.S. Cl.
CPC ............ *C09D 11/101* (2013.01); *C09D 11/36* (2013.01); *B41M 5/0047* (2013.01); *B41M 5/0058* (2013.01); *B41M 5/0088* (2013.01); *B41M 7/009* (2013.01); *B41M 7/0081* (2013.01)

(58) Field of Classification Search
CPC .... C09D 11/101; C09D 11/36; B41M 5/0047; B41M 5/0058; B41M 5/0088; B41M 7/0081; B41M 7/009
See application file for complete search history.

(56) References Cited

U.S. PATENT DOCUMENTS

| | | | |
|---|---|---|---|
| 4,264,483 A | | 4/1981 | Laufer et al. |
| 5,667,571 A | * | 9/1997 | Ono .................. C09D 11/17 106/31.48 |
| 6,593,390 B1 | | 7/2003 | Johnson et al. |
| 7,322,688 B2 | | 1/2008 | Woudenberg |
| 7,635,181 B2 | | 12/2009 | Tsuchimura et al. |
| 2005/0176841 A1 | | 8/2005 | Krohn |
| 2007/0139502 A1 | | 6/2007 | Held et al. |
| 2008/0038570 A1 | | 2/2008 | Satou et al. |
| 2008/0090930 A1 | | 4/2008 | Madhusoodhanan et al. |
| 2009/0036570 A1 | | 2/2009 | Anderson |
| 2011/0190429 A1 | | 8/2011 | Muhammad et al. |
| 2013/0140806 A1 | | 6/2013 | Wilkinson |
| 2014/0199527 A1 | | 7/2014 | Yu et al. |
| 2014/0212634 A1 | | 7/2014 | Kameyama et al. |
| 2015/0126638 A1 | | 5/2015 | Abergel et al. |

FOREIGN PATENT DOCUMENTS

| | | |
|---|---|---|
| CA | 1186143 A | 4/1985 |
| JP | 2005036022 A | 2/2005 |
| JP | 2005054127 A | 3/2005 |
| JP | 2009276722 A | 11/2009 |
| JP | 2015004063 A | 1/2015 |
| JP | 2015117030 A | 6/2015 |
| JP | 2017036072 A | 2/2017 |
| WO | 2012022962 A1 | 2/2012 |
| WO | 2013031871 A1 | 3/2013 |

OTHER PUBLICATIONS

International Search Report and Written Opinion for Application No. PCT/US2017/27029 dated Jul. 6, 2017 (16 pages).
European Patent Office Supplemental Search Report for Application No. 17782990 dated Nov. 4, 2019 (7 pages).
Japanese Patent Office Action for Application No. 2018-553451 dated Dec. 3, 2019 (5 pages, statement of relevance included).

* cited by examiner

*Primary Examiner* — Lucas A Stelling
*Assistant Examiner* — Sathavaram I Reddy
(74) *Attorney, Agent, or Firm* — Michael Best & Friedrich LLP

(57) ABSTRACT

A hybrid inkjet ink comprising a water miscible organic solvent, a UV radiation-curable material and appropriate photoinitiator, and an epoxide-containing material and printed decorations produced by applying the inkjet ink images to an aluminum substrate.

14 Claims, No Drawings

SOLVENT-UV HYBRID INKJET INK FOR ALUMINUM BEVERAGE CAN DECORATION

RELATED APPLICATIONS

This application is a continuation of U.S. patent application Ser. No. 15/229,557, filed Aug. 5, 2016, which claims priority to U.S. Provisional Patent Application No. 62/322,007, filed Apr. 13, 2016, the entire content of both prior-filed applications is incorporated by reference herein.

FIELD

This invention pertains to solvent-UV hybrid inkjet inks adapted for use in inkjet decoration of aluminum beverage cans, to decorative and clear coatings produced with such inks, and to aluminum beverage cans decorated with images applied with such inks.

BACKGROUND

Inkjet printing is widely used for digitally applying images to various substrates, which may be two-dimensional or three-dimensional. Such printing is achieved using inkjet printers having one or more printheads with nozzles for jetting the ink onto the substrate. The printheads are typically mounted on a carriage that moves back and forth as the substrate is advanced to receive the ink. The printheads can also be maintained in a stationary position and the substrate moved past the printheads.

Currently, inkjet inks are formulated either with solvent carriers or with UV curable inks so that they can dry or cure, respectively, by solvent evaporation or UV radiation curing. Typically, solvent-based inkjet inks can accept high pigment loadings and produce thinner, more flexible coatings than UV cured inks. UV-cured inkjet inks, however, also have important advantages, including quick curing, low VOCs, and good chemical resistance.

The high pigment loadings achievable with solvent-based inks are not typically achievable with UV curable inks because these inks are inherently more viscous than solvent-based inks. Loading these inks with the high pigment levels necessary to produce intense and vibrant colors may make them too difficult to jet. Therefore, when it is desirable or necessary to produce intense and vibrant colors in inkjet printing, solvent-based inkjet inks that tolerate high pigment loadings are typically used.

Solvent-based inkjet inks, however, do have limitations. For example, they typically do not adhere well to nonporous substrates like metal. Also, the final cured solvent-based inkjet ink films typically do not have good solvent resistance.

Finding an alternative to conventional printing on aluminum beverage cans that allows easy customization of decoration and eliminates the need for very large print runs is highly desirable. Conventional printing on aluminum beverage cans (e.g. offset printing) is cumbersome since a plate must be produced for each image and color, and so a run of at least a substantial number of printed-cans is required by can manufacturers to recoup the plate costs. Digital printing using inkjet technology has the potential to revolutionize the industry since it can vary the image and color on-demand, and has the ability do so for single cans or small print runs.

Therefore it would be highly desirable to find a way to decorate aluminum beverage cans using digital inkjet printers in order to take advantage of the speed, accuracy, economy, and ready customization of digital inkjet printing. Because of challenges presented by current solvent-based or UV curable inkjet inks like those noted above, this is not generally practical.

In the beverage can industry, ink performance is assessed by successfully passing the following critical evaluation points: 1) image resolution and quality, 2) ink cohesion with an overprint varnish, and 3) ink adhesion to the aluminum can. This assessment occurs throughout the can-making process, before and after heat exposure (thermal stress), can necking (mechanical stress), and pasteurization (chemical stress).

Currently, the two-piece metal decoration process is carried out by first printing images on the outside of the can followed by an immediate application of a coating on the surface of the entire can (first piece), which is cured by baking at temperatures of 180-215° C. for 3-5 minutes. After this, the can is run through another baking step to thermally cure an inside spray-coated epoxy film that forms a barrier between the aluminum and beverage to protect product integrity. The cans are then subjected to a necking process, which reduces the diameter of the top edge of the cylindrical can down to end specifications.

During the necking procedure, the decoration and coating on the outer surface of the can body is exposed to significant mechanical stress and friction. Therefore application of overly thick or non-uniform decorative coatings may lead to decoration and coating failures. Additionally, the necked cans will also be subjected to chemical stress by pasteurization prior to beverage filling and lid closure (second piece of two piece can), where the cans are submersed in 1% detergent at about 80-95° C. for 10-15 minutes. Since coatings prepared using low viscosity inks have suffered when subjected to this pasteurization step, it is also very important to ensure that any alternative formulations are able to withstand the stress of this chemical process.

One type of digital inkjet ink that has the potential to meet the above requirements is acrylate-based UV curable ink. This type of ink generally: a) has excellent weather- and light-fastness durability, b) can be formulated at a 100% solids level to produce good overall film hardness, and c) is highly chemically resistant when sufficiently crosslinked. However, jettable acrylate-based UV curable inks have not generally been adopted in the marketplace because: 1) they produce overly thick printed images that impede necking, and 2) adhesive and cohesive failures are often encountered after the pasteurization step.

A solvent-based digital ink might be considered to address the film thickness issue. This type of ink is thermally cured by solvent evaporation, leaving behind about 12-30% solids, producing a much thinner film. However, solvent-based inks are also rejected in the marketplace due their poor weatherability, light-fastness, and chemical resistance, and their high VOC content. As a result, solvent-based digital inks produce poor image quality compared to UV curable inks in metal can decorating applications.

Embodiments of the present invention provide unique advances in digital printing on aluminum beverage cans using inkjet technology. These unique embodiments successfully pass the critical evaluation points and maintain high image quality and performance under duress from thermal stress due to oven baking and curing, mechanical stress due to can necking, and chemical stress due to pasteurization, and thus comprise a very significant contribution to the art.

SUMMARY OF THE INVENTION

Embodiments of the present invention overcome the drawbacks of both acrylate-based UV curable and solvent-based inks by providing jettable low viscosity inkjet inks comprising a unique hybrid of UV-curable and solvent-based inks. These embodiments have highly desirable properties and advantages including: a) excellent weather- and light-fastness durability, b) ability to form thin films that can be formulated to a range of desired thicknesses, and c) excellent chemical resistance.

Another important characteristic of embodiments is the ability to control step-wise cure. When the printed image is UV-irradiated first, the resulting semi-cured film becomes immobile (pinned), yet is still wet due to the presence of unevaporated solvent. By applying to this semi-wet image an overprint varnish (by, e.g., an industry conventional roller coating process), intermixing of ink materials with overprint varnish components is achieved. This new ink-varnish composite produces a strong cohesion layer between the ink and varnish after the final thermal curing. Commercially available overprint varnishes can be used. The overprint varnish preferably will include a solvent which may be either aqueous or organic.

Finally, strong adhesion of the ink-varnish composite to aluminum cans may be enhanced by adding to the hybrid ink a third component that contains an epoxide functional group. By adding an epoxide-containing component to the hybrid ink and exposing the ink to high temperatures, the strain energy of the epoxide cyclic three-membered ring is released. At the molecular level, it is believed that application of elevated temperatures during the heat phase of the curing process is believed to catalyze the ring to break it open and covalently bind the ink to the aluminum surface.

Hybrid inkjet ink embodiments of the present invention include, as necessary ingredients, about 3-49% by weight organic solvent based on the total weight of the ink, about 3-80% by weight of a UV radiation-curable material and an appropriate photoinitiator based on the total weight of the ink, and about 1-30% by weight of an epoxide-containing material based on the total weight of the ink. The organic solvent must be water miscible and preferably is food grade for applications to beverage cans. The organic solvent may be chosen from the group comprising of carbonates, lactones, glycols, and glycol ethers. Among these, lactones are currently preferred. The miscibility of the organic solvent with water based on weight percent ratio of organic solvent to water, should be between about 95:5 and 5:95, and preferably between about 40:60 and 60:40.

The UV radiation curable material may be chosen from one or more of a monofunctional UV curable monomer, a difunctional UV curable monomer or a trifunctional UV curable monomer. Alternatively, the UV curable component can contain two or more of a monofunctional UV curable monomer, a difunctional UV curable monomer or a trifunctional UV curable monomer. Finally, a mixture of all three of a monofunctional UV curable monomer, a difunctional UV curable monomer and a trifunctional UV curable monomer may be used.

In embodiments, the monofunctional UV curable monomer may be a cycloaliphatic acrylate. Preferred cycloaliphatic acrylates include isobornyl acrylate and a most preferred cycloaliphatic acrylate is 4-tert-butylcyclohexylacrylate.

When a difunctional UV curable monomer is used, it will act as a crosslinker. Difunctional monomers improve the hardness and chemical resistance of the film, as well as accelerate the rate of polymerization. Difunctional UV curable monomers that can be used include aliphatic, cycloaliphatic, polyester, polyurethane, and ethylene/propylene glycol diacrylates. Hexanediol diacrylate is preferred in embodiments and a most preferred difunctional UV curable monomer is dipropylene glycol diacrylate.

When a trifunctional UV curable monomer is used, it will also act as a crosslinker. One particularly preferred trifunctional UV curable monomer is propoxylated(3) trimethylopropane triacrylate. Trifunctional monomers provide harder films and a faster curing response with lower UV dosages.

The UV curable component may also contain a resin to act as an adhesion promoter and/or to improve the hardness of the final coating. The resin may be, for example, one or more of a polyol, an acrylated polyester, or an acrylated polyurethane. The resin may be UV-radiation curable or it may not be UV-radiation curable. The molecular weights of the resin preferably will be less than about 100,000 Daltons, and most preferably will be in the range of about 1000-50,000 Daltons.

The composition will also include epoxy functional modifiers and photoinitiators that act as polymerization initiators.

The epoxide containing material will be a mono-, di-, or tri-functional epoxide chosen from the group comprising aliphatic, aromatic, saturated and unsaturated epoxides. Among these, aliphatic epoxides are currently preferred. As explained earlier, the epoxide containing material is believed to act as cross-linkers and to improve the adhesion to metal oxide surfaces, such as the aluminum oxide found in the surface of aluminum cans. The epoxy containing material may comprise mono- or di-epoxy containing monomers. Preferred epoxy functional modifiers include cyclohexyl dimethanol diglycidyl ether. A particularly preferred epoxy functional modifier is neopentyl glycol diglycidyl ether.

While the inkjet ink composition may be used as a colorant-free clear coating or varnish, in most applications it will include a colorant, which can be pretreated so that it is self-dispersing or it may include a colorant in the form of a pigment or dye in combination with a separate dispersant. In the latter case the colorant will be stabilized using appropriate dispersants that are compatible with the UV curable component, the epoxy functional modifier, and the solvent. One measure of compatibility is that the combined components in the ink must be stable at elevated temperatures, broadly from about 20-80° C. for four weeks, and preferably from about 20-60° C. for two weeks.

In embodiments of the invention, a dispersant is preferably added not only to improve the dispersibility of the colorant (when needed) but also to improve the storage stability of the ink. Examples of dispersants that can be used include hydroxyl group-containing carboxylate esters, salts of long-chain polyaminoamides and esters of high molecular weight acids, salts of high molecular weight polycarboxylic acids, salts of long-chain polyaminoamides and esters of polar acids, esters of high molecular weight unsaturated acids, high molecular weight copolymers, modified polyurethanes, modified polyacrylates, polyetherester-based anionic surfactants, salts of naphthalenesulfonic acid-formalin condensation products, salts of aromatic sulfonic acid-formalin condensation products, polyoxyethylene alkylphosphate esters, polyoxyethylene nonylphenyl ether, and stearylamine acetate.

Specific examples of suitable dispersants include "Anti-Terra-U (a polyaminoamide phosphate)", "Anti-Terra-203/204 (salts of high molecular weight polycarboxylic acids)", "Disperbyk-101 (a phosphate salt of a polyaminoamide and an acid ester), 107 (a hydroxyl group-containing carboxylate ester), 110 and 111 (copolymers that contain acid groups), 130 (a polya-25 mide), 161,162, 163,164, 165, 166 and 170 (high molecular weight copolymers)", "Bykumen (an ester of a high molecular weight unsaturated acid)", "BYK-P104, P105 (high molecular weight unsaturated polycarboxylic acids", "P104S, 240S (systems containing a high molecular weight unsaturated polycarboxylic acid and silicon)", and "Lactimon (a combination of a long-chain amine, an unsaturated polycarboxylic acid, and silicon)". These products are available from BYK Chemie. Other suitable dispersants include "Efka 44, 46, 47, 48, 49, 54, 63, 64, 65, 66, 71,701, 764 and 766", "Efka Polymer 100 (a modified polyacrylate), 150 (an aliphatic modified polymer), 400, 401,402,403,450, 451,452 and 453 (modified polyacrylates), and 745 (a copper phthalocyanine system)" (Efka Chemicals), include "Florene TG-710 (a urethane oligomer)", "Flonone SH-290 and SP-1000", and 40 "Polyflow No. 50E and No. 300 (acrylic copolymers)"; and products manufactured by Kusumoto Chemicals Ltd. include "Disparlon KS-860, 873 SN and 874 (high molecular weight dispersants), #2150 (an aliphatic polyvalent carboxylic acid), and #7004 (a polyether ester)" (Kyoeisha Chemical Co., Ltd.)

Still other suitable dispersants include "Demol RN and N (sodium salts of naphthalene-sulfonic acid-formalin condensates), MS, C and SN-B (sodium salts of aromatic sulfonic acid-formalin condensates), and EP", "Homogenol L-18 (a polycarboxylic acid type polymer)", "Emalgen 920, 930, 931,935,950 and 985 (polyoxy-ethylene nonylphenyl ethers) ", and "Acetamine 24 (a coconut amine acetate) and 86 (stearylamine acetate)" (Kao Corporation) "Solsperse 5000 (a phthalocyanine ammonium salt system), 13940 (a polyesteramine system), 17000 (a fatty acid amine system), and 24000" (Avecia Ltd.) "Nikol T106 (a polyoxyethylene sorbitan monooleate) and MYS-IEX (a polyoxyethylene monostearate), and Hexagline 4-0 (a hexaglyceryl tetraoleate)" (Nikko Chemicals Co., Ltd.) "Ajisper PB821 and PB822 (basic dispersants)". The quantity of the dispersant within the ink preferably represents from 0.1 to 10% by weight of the total weight of the ink (Ajinomoto-Fine-Techno Co., Inc.).

In embodiments the inkjet ink composition will also include conventional ingredients like colorants, photosensitizers, photosynergists, stabilizers and surfactants.

Examples of surfactants that can be used include fluoro-surfactants, anionic surfactants such as sodium dodecylbenzenesulfonate, sodium laurate, and ammonium salts of polyoxyethylene alkyl ether sulfate; and nonionic surfactants such as polyoxy-ethylene alkyl ethers, polyoxyethylene alkyl esters, polyoxy-25 ethylene sorbitan fatty acid esters, polyoxyethylene alkylphenyl ethers, polyoxyethylene alkylamines, and polyoxyethylene alkylamides. Other examples of surfactants that can be used include polyoxyalkylene polyalkylene amines and sorbitan esters. Examples of polyoxyalkylene polyalkylene polyamines, include Discole N-503, N-506, N-509, N-512, N-515, N-518, and N-520. (Dainichiseika Coln and Chemicals Mfg. Co.)

Printed decorations prepared using the inkjet composition of embodiments (exclusive of overprint varnish) will have a film thickness of about 1 to 12 µm, preferably about 1-10 µm and most preferably about 1-8 µm. These ink thicknesses enable the coating to successfully withstand mechanical stress put on the can container by the necking machinery.

The coatings, in their final cured state (printed decoration and overprint varnish) will have a pencil hardness between 3B to 9H, and preferably between 2B to 9H.

In embodiments an overprint varnish will be applied to coatings prepared using the inkjet printing compositions. Overprint varnishes are used to help protect ink coatings. However, in embodiments herein, the level of protection and enhanced image quality achieved by intermixing the overprint varnish and the hybrid ink embodiments is outstanding.

In further embodiments, processes to produce decorative coatings in accordance with embodiments will entail: A) application of the inkjet composition using an inkjet printer followed by UV irradiation to achieve a partial cure; B) application of the overprint coating and, C) final heating to produce full cure. As noted earlier, in this wet-on-wet embodiment the UV curable component is initially pinned by applying UV radiation to cure (polymerize) that component, leaving the unevaporated solvent of the hybrid ink in place and an interim coating in the form of a "semi-wet print". When the overprint coating is applied to the "semi-wet print" it intermixes with the water miscible solvent component before the final heating step. While heating times and temperatures may vary depending on system parameters, the heating following the initial application may be carried out in an oven, for example, at about 80-350° C. for about 1-40 minutes, and most preferably about 180-215° C. for about 3-5 minutes.

While the inventors do not intend to limit the invention to any theoretical mechanisms or pathways, it is believed that the outstanding adhesion image quality, glossiness and other properties achieved may be obtained when the aluminum oxide passivation layer formed on the surface of the can container during the heating step reacts with the oxygen in the epoxide group of the epoxide-containing component to initiate reaction with other components in the ink composition. Another non-limiting possible explanation may be that the $Al^{3+}$ ion species on the surface of the can is coordinated by the epoxide oxygen, catalyzing a ring-opening and reaction with other components of the ink.

EXAMPLES

The following examples are presented for purposes of illustration and are not intended to be exhaustive or limiting of any embodiment of the invention.

1. Adhesion to Aluminum Substrate

The test specimens were successfully necked cans with inkjet-applied decoration and an overprint varnish top coat. An ASTM standard test method D3359-09 was used to measure and examine the adhesion of inkjet-applied hybrid ink. A hard metal straight edge was used to make straight cuts with a sharp razor blade to form intersecting 7 to 8 crosshatched cuts in selected areas of the body and neck of the cans. The tape applied was a 0.75" wide transparent Scotch® Brand Tape, Cat 600.

The crosshatch adhesion tests on both the necked areas of the can specimens and on the bodies of the can specimens for CMYK image hybrid coatings did not show any adhesion failure and had outstanding adhesion ratings of 4B-5B, before and after pasteurization.

2. Gloss Level

An ASTM standard test method D523-08 was used to measure the specular gloss of nonmetallic specimens for glossmeter geometries of 20, 60, and 85° using two specimens: 1) a hybrid black ink prepared in accordance with embodiments of the invention and applied using an inkjet printer, and 2) a commercial black beverage can coating prepared using conventional offset printing. A black hybrid inkjet ink as follows was used:

| Material Type | Percent by Weight |
| --- | --- |
| 4-tert-butylcyclohexyl acrylate (monomer) | 13 |
| 2-phenoxyethyl acrylate (monomer) | 4 |
| Propoxylated (3) Trimethylopropane Triacrylate | 6 |

-continued

| Material Type | Percent by Weight |
|---|---|
| (trifunctional monomer) | |
| Resin | 12 |
| Amine Synergist | 8 |
| Antioxidant and thermal stabilizer blend | 1 |
| Surfactant | 1 |
| Photoinitiator Norrish Type I | 3.5 |
| Photoinitiator Norrish Type II | 3.5 |
| Black Pigment Dispersion (colorant) | 15 |
| Gamma-butyrolactone (solvent) | 20 |
| Neopentyl glycol diglycidyl ether (epoxide) | 13 |
| | 100 |

The 20° geometry is advantageous for comparing specimens having 60° gloss values higher than 70. The 60° geometry is used for inter-comparing most specimens and for determining when the 20° geometry may be more applicable. The 85° geometry is used for comparing specimens for sheen or near-grazing shininess; it is most frequently applied when specimens have 60° gloss values lower than 10.

The following results were obtained:

| | Gloss Level | |
|---|---|---|
| Angle | Commercial Black | Hybrid Black |
| 20° | 57.6 | 66.7 |
| 60° | 87.4 | 89.9 |
| 85° | 96.6 | 94.4 |

This data demonstrates that the hybrid inkjet black ink coating can produce gloss levels commensurate with those achieved using conventional offset printing processes. In other words, the new hybrid ink is shown here to enable inkjet printing on aluminum cans to produce gloss levels commensurate with those achieved in conventional offset printing processes thereby delivering all of the benefits of inkjet printing to the can printing process.

What we claim is:

1. A hybrid inkjet ink comprising, in percent by weight based on the weight of the hybrid inkjet ink:
   about 3-49% of gamma-butyrolactone;
   about 3-80% by weight of a UV radiation-curable material and a photoinitiator, the UV radiation-curable material comprising
      a monofunctional UV radiation-curable monomer, which is 4-tert-butylcyclohexylacrylate, 2-phenoxyethyl acrylate, or a combination thereof; and
      a trifunctional UV radiation-curable monomer, which is propoxylated(3)trimethylopropane triacrylate;
   a resin; and
   about 1-30% by weight of neopentyl glycol diglycidyl ether.

2. The hybrid inkjet ink of claim 1, wherein the UV radiation-curable material further comprises a difunctional UV radiation-curable monomer selected from the group consisting of aliphatic, cycloaliphatic, polyester, polyurethane, and ethylene/propylene glycol diacrylates.

3. The hybrid inkjet ink of claim 2, wherein the difunctional UV radiation-curable monomer is hexanediol diacrylate, dipropylene glycol diacrylate, or a combination thereof.

4. The hybrid inkjet ink of claim 1, wherein the resin has a molecular weight of about 1000-50,000 Daltons.

5. The hybrid inkjet ink of claim 1, wherein the resin is selected from the group consisting of polyols, acrylated polyesters, acrylated polyurethanes, and a combination thereof.

6. The hybrid inkjet ink of claim 1, further comprising a colorant.

7. A printed decoration comprising:
   an aluminum substrate; and
   the hybrid inkjet ink according to claim 1 applied to the aluminum substrate using an inkjet printer.

8. A method of producing a printed decoration, applying the hybrid inkjet ink of claim 1 to an aluminum substrate using an inkjet printer to form an image on the aluminum substrate; irradiating the image with UV light to achieve a partial cure of the image, pinning the image to the aluminum substrate while leaving unevaporated solvent in place within the image; applying an overprint varnish to intermix with the unevaporated solvent in the image; and heating the image to drive off the unevaporated solvent and produce a full cure of the image as a printed decoration on the aluminum substrate.

9. The method of claim 8, wherein the overprint varnish includes an aqueous carrier.

10. The method of claim 8, wherein the overprint varnish includes an organic carrier.

11. The method of claim 8, wherein the aluminum substrate is an outer surface of an aluminum beverage can.

12. The method of claim 8, wherein the printed decorations has a thickness exclusive of overprint varnish of about 1 to 12 μm.

13. The method of claim 8, wherein the printed decorations has a thickness exclusive of overprint varnish of about 1-8 μm.

14. A hybrid inkjet ink comprising, in percent by weight based on the weight of the hybrid inkjet ink:
   about 20% of gamma-butyrolactone;
   about 13% of 4-tert-butylcyclohexylacrylate;
   about 4% of 2-phenoxyethyl acrylate;
   about 6% of propoxylated(3)trimethylopropane triacrylate;
   about 12% of a resin; and
   about 13% of neopentyl glycol diglycidyl ether.

* * * * *